United States Patent [19]

Simpson

[11] Patent Number: 4,875,224

[45] Date of Patent: Oct. 17, 1989

[54] ASYNCHRONOUS COMMUNICATION SYSTEMS

[75] Inventor: Hugo R. Simpson, Stevenage, England

[73] Assignee: British Aerospace plc, London, England

[21] Appl. No.: 195,247

[22] Filed: May 18, 1988

[30] Foreign Application Priority Data

May 21, 1987 [GB] United Kingdom ................. 8711991

[51] Int. Cl.⁴ ........................................... H04L 25/36
[52] U.S. Cl. .................................. 375/118; 364/200; 365/78
[58] Field of Search ........................ 375/118; 369/60; 365/78, 221; 364/200 MS File, 900 MS File

[56] References Cited

U.S. PATENT DOCUMENTS

3,855,424 12/1974 Tharmaratnam et al. ............ 365/78
4,433,394 2/1984 Torii et al. .......................... 365/221

Primary Examiner—Robert L. Griffin
Assistant Examiner—Marianne Huseman
Attorney, Agent, or Firm—Nixon & Vanderhye

[57] ABSTRACT

An asynchronous communication system writes data from an input (I) to an output (O) via region of shared memory. The region of shared memory is divided into four slots (S1–S4). The system includes means to write data (1, 5, 6) which select a pair of slots S1, S2; S3, S4) not currently selected for reading and one of the slots of the selected pair which is not the slot last written to. Means to read date (2, 3, 4) select the slot last written to and route data from that slot to the output (O) so that fresh coherent data is communicated fully asynchronously from the input (I) to the output (O).

13 Claims, 5 Drawing Sheets

ASYNCHRONOUS COMMUNICATION SYSTEMS

BACKGROUND OF THE INVENTION

This invention relates to asynchronous systems and is more particularly concerned with communication between elements of a digital computer.

The need to ensure accurate and timely transfer of data between independent processes arises in a number of situations and is of particular importance in the exploitation of parallel architectures within distributed real time data processing systems. Conventionally systems for enabling communication between asynchronous processes running in different elements of a computer have used a region of shared memory to provide a buffer to which all the processes concerned have access and to which each process can read or write data in its own time. However known communication systems suffer the disadvantage that the data passing through the buffer can be corrupted if, for example, one process starts to read data from the buffer whilst another process is part way through writing data to the buffer. To overcome this difficulty known communications systems have relied upon mutual exclusion, that is one process is prevented from writing data to the buffer if the other process has already started to read data. Although this successfully avoids conflict between the writing and reading processes it results in a system which is not fully asynchronous since the action of one process in accessing the buffer can affect the timing of the other process.

British Patent No. 2039102 discloses one example of a prior art system for enabling communication between two asynchronous elements. The buffer memory is divided into two parts to enable data to flow simultaneously in both directions between the two asynchronous elements. As with other known devices the reading and writing processes are inherently susceptible to conflict and so the system described relies upon the transmission of interrupts to the different asynchronous elements to prevents conflict. As a result there is interference between the timing of the units so that they are not fully asynchronous.

SUMMARY OF THE INVENTION

According to a first aspect of the present invention a method of operating an asynchronous communication system comprising writing data from an input of the system to a region of shared memory divided into slots and reading data from the region of shared memory to an output of the system is characterised in that the memory is divided into four slots comprising two pairs of two slots each, in that means to write data include first selector means and select a pair of slots from which no data is being read and one of the slots of the pair which is not the slot last written to and write data from the input to the said one slot and in that means to read data include second selector means and select a slot last written to and read data from the said slot last written to to the output so that fresh coherent data is communicated fully asynchronously from the input to the output.

The present invention provides a method of communicating data via a buffer which is inherently incapable of conflict between the reading and writing of data so that data may be communicated fully asynchronously without any interference between the timing of the reading and writing processes. Moreover the method of the present invention ensures that data is always passed as a coherent set and that the data read is always fresh i.e. the data read by the reader is always the latest data item produces by the writer.

Preferably data is written into the region of shared memory by a procedure including three sequential steps wr,w0,w1, $$wr.d[wp,\overline{s[wp]}]:=input$$

$$w0:\{s[wp]:=\overline{s[wp]} \,\|\, w:=wp\}$$

$$w1:wp:=\bar{r}$$

and data is read by a process including two sequential steps r0,rd $$r0:\{r:=w \,\|\, rv:=s\}$$

$$rd:output:=d[r,rv[r]]$$

The formalism used to define the operations for writing and reading is fully described in the description with respect to the drawings below.

According to a second aspect of the present invention an asynchronous communication system including a region of shared memory divided into slots, means to write data from an input to the region of shared memory and means to read data from the region of shared memory to an output is characterised in that the slots of the region of shared memory comprise a first and second pair of slots, and means to write data including a write pair selected switch arranged to route data to one or other of the first and second pair of slots, and a write slot selecting switch associated with each pair of slots and arranged to route data to one or other of the slots of the pair, the means to read data including a read pair selecting switch arranged to route data from one or other of the first and second pair of slots and a read slot selecting switch associated with each pair of slots and arranged to route data from one or other of the slots of the pair, the means to write data and the means to read data being arranged so that there is fully asynchronous transmission of fresh coherent data from the input to the output via the region of shared memory.

BRIEF DESCRIPTION OF THE DRAWINGS

An asynchronous communication system in accordance with the present invention is now described in detail with reference to the accompanying drawings in which.

DETAILED DESCRIPTION OF PREFERRED EMBODIMENTS

Figure 1:
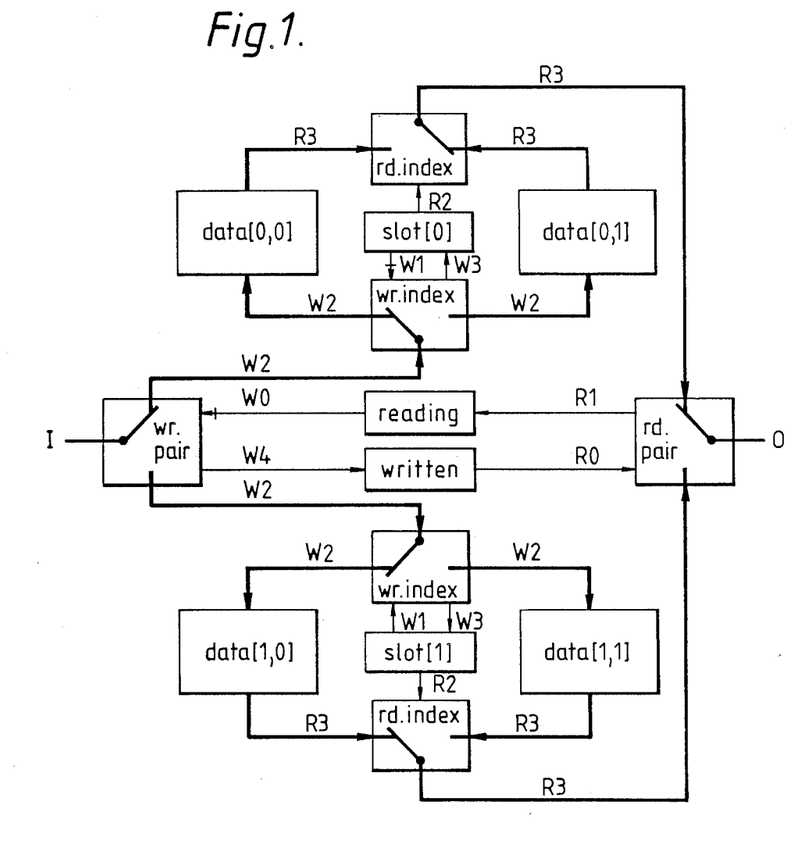
FIG. 1 is a block diagram showing data flow in a system in accordance with the present invention.

A communications system for linking two asynchronous circuits is shown in data flow format in FIG. 1 and includes four parallel data registers or slots S1–S4 arranged in pairs. The asynchronous circuits have access to the four slots S1–S4 via data paths controlled by pair selecting switches 1,2 and slot selecting switches 3,4,5,6. The pair and slot selecting switches are arranged to route data transmitted to and from the slots in such a manner that the reading and writing processes are fully orthogonal, that is the process of writing data to the slots is unaffected by the concurrent reading of data and vice versa. The communications system therefore enables the transmission of fresh coherent data via the slots without any interference between the timing of the different asynchronous circuits.

Figure 2:
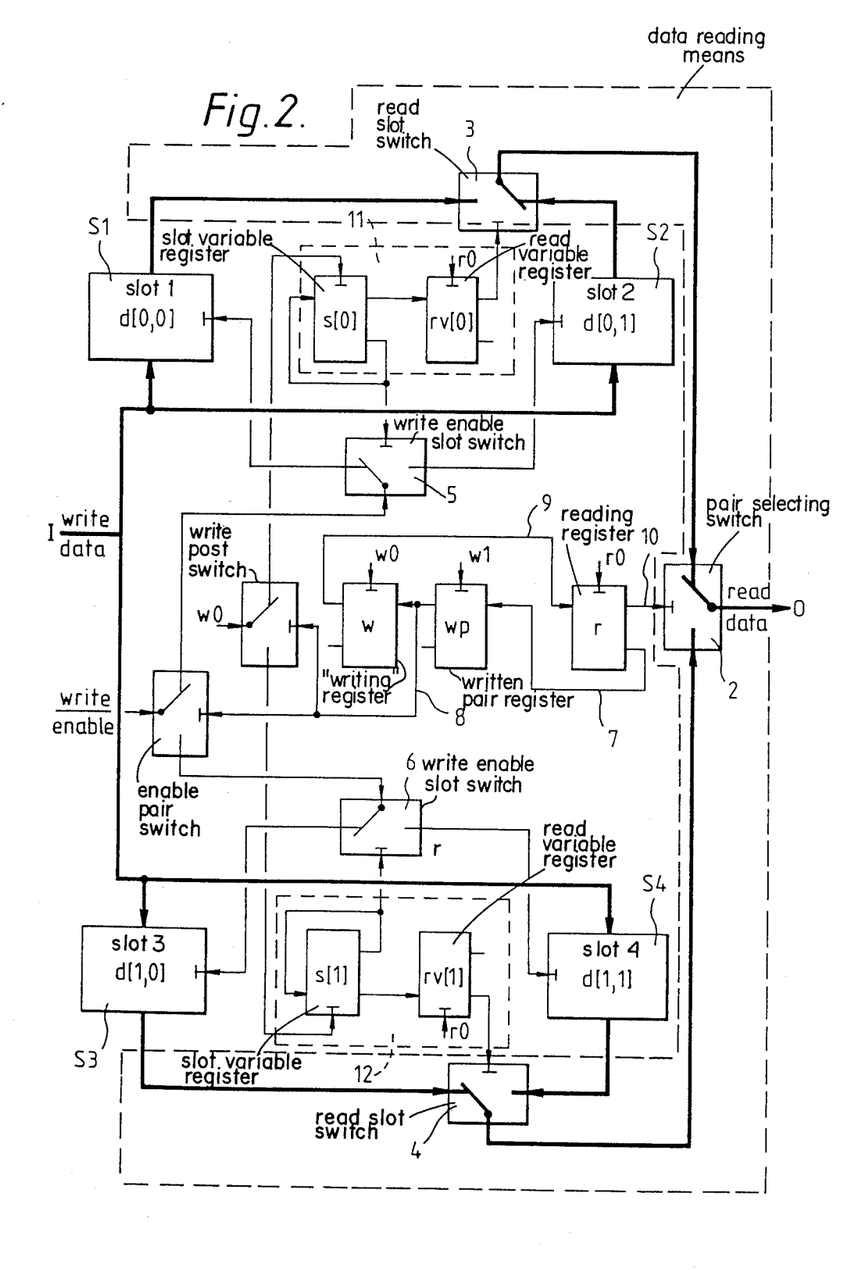
FIG. 2 is a block diagram showing a first embodiment of the present invention.

In the embodiment shown in FIG. 2 an input I is connected so as to have parallel access to each of the slots S1–S4. Data is written to a slot only when the slot receives a write enabling signal. The write enabling signal is first directed to a bistable write pair selecting switch 1 which directs the enabling signal to one or other of the two pairs of slots S1,S2; S3,S4. A read pair selecting switch 2 routes data being read from one or other of the pairs of slots S1,S2; S3,S4. Signals pass via lines 7,8,9,10 connecting the read and write pairs selecting switches 1,2. The write selecting switch 1 toggles between its two states in response to a signal indicating the state of the read pair selecting switch 2 so that data is always written to a pair of slots S1,S2; S3,S4 which is not currently being read.

There are associated with each pair of slots S1,S2; S3,S4 a read slot selecting switch 3,4 and a write slot selecting switch 5,6 together with a register 11,12 which records the slot to which data was last written. This register is updated by a signal from the write slot selecting switch 5 each time a fresh data item is written to one of the two slots of the pair. The state of the register 11,12 also determines the states of the associated read slot selecting switch 3,4 and write slot selecting switch 5,6 so that fresh data is always written to a slot which is not the slot last written to and data is always read from the slot which is the slot last written to. The operation of the system is discussed in further detail in the discussion below.

Although in this embodiment the slots (S1–S4) are an integral part of the communications system alternative arrangements in which the system returns addresses to control access to an external region of shared memory are equally possible.

In some circumstances it is convenient to use a clock to constrain the timing of the writing and reading processes. If both the asynchronous circuits linked by the communications system are driven by a single clock then although the resulting system is no longer asynchronous at the execution level the data flow is still fully asynchronous. The only constraint on the processes is that they operate in multiples of the fundamental clock period, the processes are otherwise free to transfer data at any time, unaffected by the timing of any other process. Such an arrangement has the advantage that the system is effectively immune from dither and other metastability problems.

Figure 4:
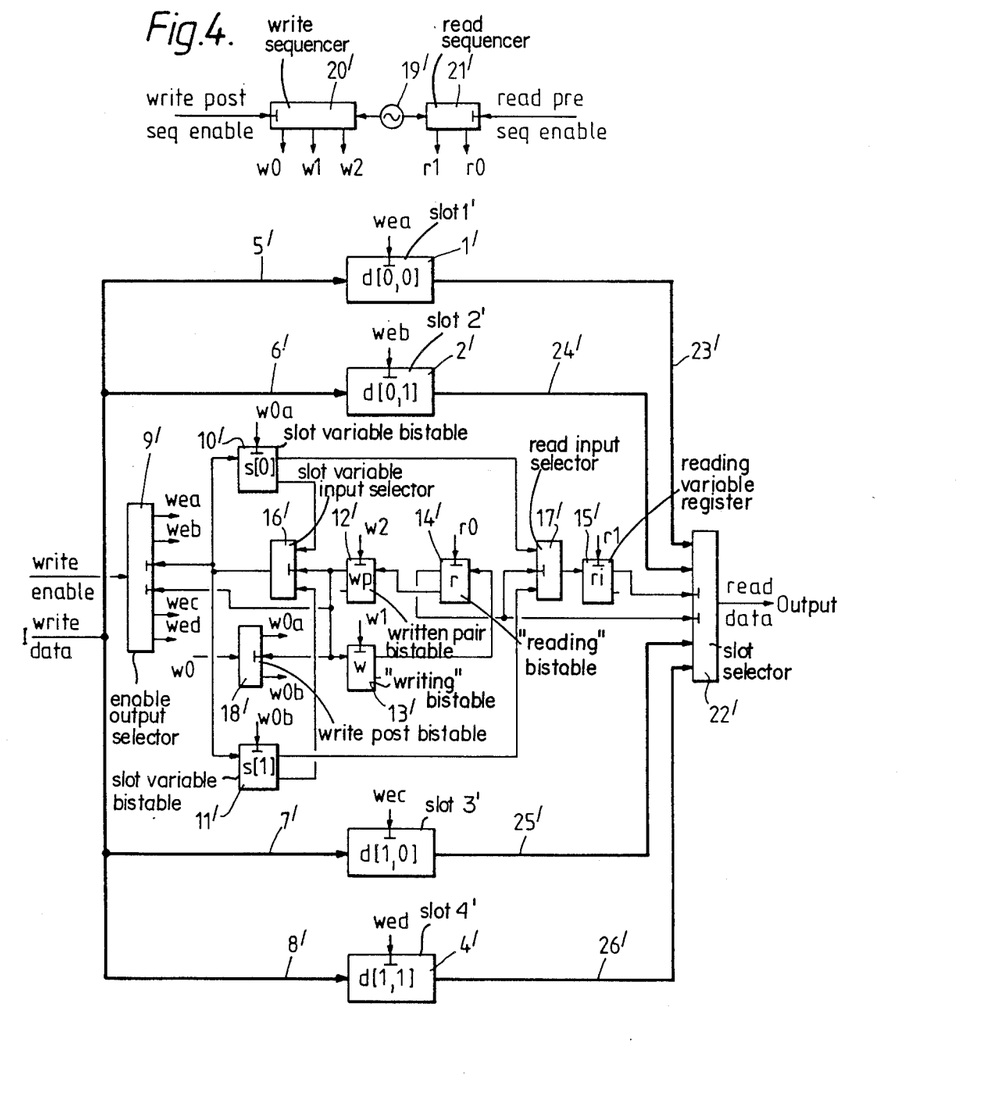
FIG. 4 is a block diagram showing an embodiment of the present invention incorporating an internal clock.

An internal clock may also be used to drive the communications system itself. FIG. 4 shows an alternative embodiment of the invention which functions in this manner.

FIG. 4 shows data coming in from the left to be captured in a selected data register, and passed out to the right by obtaining access to a selected data register. The register holding the latest data and the register selected for writing are both committed for the complete period between successive "write post" sequences.

The coupler shown in the figure comprises four parallel data registers (referred to as slots) 1', 2', 3' and 4', each having a discrete access code for both reading and writing processes. The codes are respectively [0,0], [0,1], [1,0] and [1,1] and each slot is then designated using its code eg d[0,0], d[1,0] etc. Data to be written to a slot is put onto "write data" lines 5', 6', 7' and 8', and is only latched into a given slot when it is selected by an output selector 9' which has two input lines 'a' and 'b', and four output lines 'wea', 'web', 'wec' and 'wed', each output line providing the latch signal for its associated slot. On receipt of a "latch signal", the data on the corresponding data line is latched into the associated slot, eg if the "latch signal" is presented on the output line 'wec' the data is latched into slot 3' from the data line 7'.

A series of interconnected bistables 10', 11', 12', 13', 14' and 15', a pair of two-way input selectors 16' and 17' and a two-way output selector 18' are utilised to determine the "write post" and the "read pre" sequences triggered by the writer and reader respectively. Both the "write" and "read" processes are controlled by a clock 19' and respective sequencers 20' and 21'. On operation of the "write post" sequence, pulses are supplied on lines 'w0', 'w1', 'w2' which enable the values at the input of the respective bistables to be latched into them. Similarly on the "data read" side of the coupler the sequencer 21' provides pulses on 'r1' and 'r0' which enable the values stored on the inputs of bistables 14' and 15' respectively to be latched into them.

The values of 'a' and 'b' available at the four-way output selector 9' determine into which of the four slots 1', 2', 3' and 4' the data on the data lines is latched. Similarly the values of 'y' and 'z' applied to four-way input selector 22' ie the outputs from bistables 14' and 15', indicate the slot from which data is to be read via data lines 23', 24', 25' and 26'.

During a writing sequence, the following algorithms are executed:

$$wr:d[wp,\overline{s[wp]}]:=input$$

$$w0:s[wp]:=\overline{s[wp]}$$

$$w1:w:=wp$$

$$w2:wp:\overline{r}.$$

For a reading sequence, the following algorithm is executed:

$$r0:r:=w$$

$$r1:ri:=s[r]$$

$$rd:output:=d[r,ri]$$

In each of the two algorithms,

'w', 'r' denote the last pair written and the pair being read respectively, s[0], s[1] denote the last slot in pair '0' to be written and the last slot in pair '1' to be written respectively, wp, ri denote the pair being written and the slot in the pair selected for reading respectively, 'r0' and 'r1' select (for reading) the last pair and the last slot in that pair respectively, 'w0' and 'w2' select (for writing) the inverse of the next slot in a pair and the next pair respectively;

additionally 'w0' ensures that the reader knows which slot of the pair contains the newest data, and 'w1' ensures that the reader knows which pair contain the newest data.

The operation of the system ensures that the following conditions are met:
(1) the reader must only access a single slot throughout a read operation.
(2) the writer must only access a single slot throughout a write operation.
(3) the reader and writer must never have simultaneous access to the same slot.
(4) the writer must not access the slot containing the recent previous data.
(5) the data read must be at least the most recent that existed at the start of the "read pre" sequence.
(6) following the "write post" sequence, the data available for reading must be the last data entered.

Conditions (1) to (3) above provide the data coherence and conditions (4) to (6) provide the data freshness as required for fully asynchronous communication.

The system as described will accept a first "write" process when first switched on and will be readily for normal operation thereafter. However, if the first process is a "read" process, incoherent data may be read out. If this is acceptable there is no need to apply initialisation conditions, but if it is not acceptable to read incoherent data, the following values may be initially assigned after switching the coupler on:

d[0,0]=null;

s[0]=0;

s[1]=0;

w=0;

r=0; and wp=1.

Naturally, the four-way output selector 9' and the four-way input selector 22' may be replaced by a pair of two-way output selectors and a pair of two-way inputs selectors respectively.

It may be necessary for the "writer" to have "read" access to the slot containing the latest data eg where increments are to be added to the latest data value and then stored as the next data set in another slot. Similarly "read" access may be required for the new data slot in order to check the data being deposited, the slot forming part of the work space of the system.

If the computers are clocked from an external source ie there is a common clock for both computers, the clock pulse generator may be dispensed with.

The computers may be arranged to have direct access to the interconnected bistables and may set them directly ie without the use of sequencers.

The theory underlying the present invention and several further embodiments of the present invention are now discussed in detail and contrasted with prior art systems.

In the following discussion a number of terms are used in a particular technical sense:

A process is an independent thread of execution defined by a series of sequential operations.

A system is a set of parallel processes interacting through shared memory, where the combined individual operation of the processes produces the overall operation effect of the system as a whole.

An algorithm is a series of sequential operations with a specific purpose (in this case the writing or reading of data).

A mechanism is a set of mutually compatible algorithms, data structures and control variables with a specific operational purpose (in this case process intercommunication).

The systems envisaged here are in the class where each component process runs in an endless loop to perform its dedicated function. Communication algorithms are embodied within processes wherever there is a need for interaction with the data structures and control variables of a communication mechanism. Processes and communication mechanisms may be implemented in hardware or software, or a mixture of both. Software forms may be wholly contained within a single processor or distributed over the separate processors and shared memory of a multi processor configuration. Various implementation options are considered in the paper.

PROBLEM DOMAIN

Asynchronous communication mechanisms provide solutions to interfacing and partitioning problems in digital system design. Consider for example the input of data from an asynchronous sensor process to a using process where the rates of operation and communication of the two processes are very different or vary over a wide dynamic range. In many cases it will be undesirable or impractical to lock together the operation of the two processes; in the extreme it may be totally unacceptable to make use of any form of synchronisation on account of the common point of failure vulnerability which this introduces.

An asynchronous mechanism completely decouples the communicating processes and in a sense is analogous to the buffer amplifier (ideally with infinite input impedance and zero output impedance) traditionally used in electronic systems engineering to isolate individual functions and give modularity of design. As such the asynchronous mechanism provides a form of system partitioning which is quite different from the synchronous and message passing techniques commonly found in software systems engineering.

In fact fully asynchronous forms of digital communication appear to have been regarded by many as a practical impossibility which may explain why software system development methods and languages often provide little or no support for the concept of independent shared data between concurrent processes. Lack of adequate forms of expression for such data, and for the means of access to it, is a serious deficiency when it comes to the design of asynchronous multi process systems containing shared memory. Appreciation of the existence of fully asynchronous forms of communication opens up important new design possibilities.

Aside from these application and design concerns, implementation technology shows increasing use of asynchronism in complex arrangements of processors, memories and buses (with their associated arbiters). Hitherto, interaction between such elements of a system has usually involved a measure of exclusion at some low level in the hardware but we are now seeing the advent of fully asynchronous dual port memory chips which are completely free from implicit exclusion. These new devices provide an ideal medium for exploiting the communication mechanisms described in this paper.

DESIGN REPRESENTATION

Mechanism designs are first developed in software terms and are modelled on the process intercommunication techniques of Mascot (Modular Approach to Software Construction Operation and Test). Mascot is a software design method based on data flow network concepts it comes in two main variants: Mascot 2 and Mascot 3 Here we use a small subset of Mascot 2 as this gives an economical and simple representational form for considering the dynamic characteristics of asynchronous mechanisms.

No prior knowledge of Mascot is needed. The software design notation for the paper is the slightly extended form of Pascal summarised in appendix A. The key concept here is that of the intercommunication data area (ida) which is a design entity defining control variables and data structures located in memory shared between processes, together with access procedures and functions which are the permissible control and data operations. These access operations can be implemented as an integral part of the ida, in which case the using processes call them up as external procedures and functions; or they can be embodied in the using processes as in line code or as local procedures and functions. The precise form does not matter provided that it implements the logic of the appropriate algorithms.

Although Mascot is essentially a software method its concepts are readily extended to hardware design. This is demonstrated by the derivation of equaivalent hardware forms of the fully asynchronous software mechansim. The symbols needed to express these hardware designs are given in appendix B.

BASIC REQUIREMENTS SPECIFICATION

Attention is mainly focused on the asynchronous transfer of data between two processes (the writer and the reader) through shared memory. The relative rate, time and duration of writing and reading operations are completely unconstrained.

A number of criteria must be satisfied for any fully asynchronous form of single-writer to signle-reader communication:

Asynchronism. Neither process may affect the timing of the other as a direct result of its communication operations.

Coherence. Data must always be passed as a coherent set, ie interleaved access to any data item by the writer and the reader is not permitted.

Freshness. The latest data item produced by the writer must always be made available for use by the reader.

These requirements are applicable where successive data values are set up by the writer to be sampled by the reader, and both processes run freely with no knowledge of the timing of communication operations on the other side of the mechanism. Implicit in this communication model is the fact that data may be overwritten (writer faster than reader) or repeated (reader faster than writer). This is quite different to data stream communication between a producer and a consumer, where successive values are passed without loss or repetition.

PROCESS INTERCOMMUNICATION

All the mechanisms considered in the paper are concerned with the reliable transfer of data and control values between communicating processes.

DATA COHERENCE

A communication mechanism must maintain the integrity of data items ie the set of values which make up an item must be mutally consistent when delivered to a reader. For example, consider a data item type defined as follows:

type plot=record
  x,y,z: real;
  xdot, ydot, zdot: real;
  hrs, mins, secs: 0.59
end;

If data is read which contains new x, y, z, but where the rest of the data remains at the old values, then the base position for future prediction will be incorrect. A lack of coherence in the time reference would be even more diastrous.

BIT COMMUNICATION VARIABLES

Lack of coherence is a potential hazard in any multiple field data item. Fortunately there is a variable type whose value is always guaranteed to be coherent, and where reading and writing operations can be concurrent and need not interfere with each other; this is the bit variable.

When reading such a variable there is no possibility of obtaining anything other then the old or new value (ignoring for the moment the question of initialisation and assuming that a value must be delivered as a result of a read operation). The integrity of the fully asynchronous mechanisms rests ultimately on this property of the bit variable.

Practical implementations of such variables, when used asynchronously, must ensure that:

Each variable should only be written by one process (although it may be read by both); only in this way can a writer guarantee that a reader will see the intended value.

A write operation which does not change the value must not induce any disturbance which might cause a concurrent read to obtain an incorrect value.

A read operation should not disturb the value in any way.

A write operation can only be regarded as finished when all subsequent reading of the variable will obtain the new value; thus the writing process must not continue until the new value has been unequivocally established.

FLICKER AND DITHER

There are two rather more subtle points which must be considered when making use of bit variables in asynchronous mechanisms. The first of these, flicker refers to the possibility of some sort of fluctuation of value when a bit is being switched. If reads are substantially faster and more frequent than writes, to the extent that two or more reads can occur in the period of a write, then it is possible for the reader to obtain an invalid sequence of values (new followed by old). This effect is however bounded by the duration of the write operation and can be easily avoided; for example, if read and write bit operation cycle times are the same, and if successive reads of the same bit are always separated by an interval which is equal to or longer than a bit operation, then a write can never be overlapped by more than one read.

Whereas flicker can be seen as a temporary bounded failure of a writer to establish a clear signal, dither is the potentially unbounded failure of a reader to make up its mind concerning the value that has been read. This possibility arises from the metastable effect which can occur when a bistable (a single bit memory device) is switched at a time when its input is indeterminate. Under these conditions there is no fixed time interval long enough to ensure that the bistable will, with probability one, reach a defined output state. The effects of dither are uncertain but clearly the indeterminate value (possibly fluctuating) may produce an unbounded form of flicker.

Unlike the bounded form of flicker, where practical measures can be taken to eliminate it completely, dither is an inescapable physical phenomenon which is one of the sources of glitches in asynchronous systems. However, special design techniques at a basic level can make this hazard vanishingly small (ie commensurate with other failure modes), but it is beyond the scope of this paper to explore them fully here. The more obvious measures include reducing the speed of operation, or increasing the logical path length between the asynchronous reading of a bit variable and the use of the value so obtained to write, synchronously, a further bit variable. Of course the causes and effects of dither can be removed completely by introducing common clocking arrangements, but this is not always possible or desirable in practice. The asynchronous mechanism described in this paper are no more vulnerable to dither than are the more conventional synchronous forms (eg synchronisers and arbiters).

Generally flicker and dither can be disregarded in any discussion of the software forms of communication mechanisms, on the grounds that a sound operating environment will have been provided for process execution. They do however need to be considered in the context of asynchronous hardware implementations.

INDIVISIBILITY

Data coherence is often intimately associated with indivisibility of instruction execution It is necessary to indicate any part of an algorithm where indivisibility is essential. In all other respects the algorithms in a mechanism can be regarded as being capable of unconstrained parallel execution, although in practice there may well be limitations on the extent to which this is achievable (eg where processes run in a single processor under a multi tasking executive).

Indivisibility is not the same as uninterruptibility, although the latter can be used to guarantee the former in a single processor. Indivisibility denotes that there are no concurrent operations on the variables involved in an execution sequence, whereas uninterruptibility means that the execution sequence cannot be suspended.

The special symbol ::= is used to represent an indivisibility constraint on shared variable operations in an assignment statement (operations on a process's private variables are always indivisible). Three cases are distinguished:

shared variable ::= variable; This denotes that the value is written to the shared variable in a single indivisible operation.

variable ::= shared variable; This denotes that the value is read from the shared variable in a single indivisible operation.

one shared variable ::= another shared variable; This denotes an indivisible copy operation on shared variables.

The first and second statements above, when only two processes have access to the shared variable, both prevent overlap of write and read operations and ensure coherence of the shared variable value as perceived by a reading process. The third, in addition to ensuring coherence of both variables, expresses a stronger restriction by requiring that there are no intervening operations which involve these variables.

The indivisibility constraint can be achieved at run time in two different ways, either by a higher level process scheduler which ensures that writing and reading operations do not overlap, or by a lower level dynamic exclusion mechanism (often known as arbitration). In practice dynamic exclusion is generally preferred on the grounds of flexibility and ease of programming, although it inevitably introduces an element of indeterminacy.

CONDITIONALLY ASYNCHRONOUS DESIGNS

A data area capable of holding a single item within a mechanism is known as a slot. The different mechanism designs are named according to the number of slots they contain. One, two and three slot mechanisms are developed in a software form suitable for conditionally asynchronous communication within a single processor. In this case the writing and reading processes are either tasks running under a multiprogramming executive, or interrupt routines invoked directly by an external hardware stimulus. Each design is discussed in terms of the way it works and the conditions under which it supports asynchronous communication.

ONE SLOT MECHANISM

Table 1 gives the design for a one slot ida. This is the simplest possible form of asynchronous communication. The ida module illustrates the principal features of the notation in that it defines a variable in shared memory (data), together with two access operations (write and read).

The single slot is initialised to the value null to ensure data coherence should the reader access the ida before the first write. Shared memory initialisation is not the responsibility of either of the using processes but must be carried out before the data is accessed (the null value can be set as a preset during compilation, or by some special form of pre-execution operation).

The integrity of the one slot mechanism depends totally on the fact that writes and reads do not overlap, and this is indicated by the indivisible assignment to data in the write access procedure. Provided that writes and reads are never concurrent the mechanism behaves as if it were fully asynchronous. However if they are concurrent (and therefore one operation is delayed), performance falls short of the basic requirements in that asynchronism is not achieved although the coherence and freshness conditions are met.

TWO SLOT MECHANISM

A slightly more sophisticated and less constrained form of communication is provided by the two slot ida as shown in table 2 This mechanism is sometimes called the swung buffer since alternate data items are written to alternate buffers which are then swung into visibility for output.

The two slot design is briefly described as follows:

An array data holds information in transit and a control variable written indicates the latest data.

The preset statements ensure that a read occurring before the first write obtains the null data value.

The wirte algorithm selects alternate slots for writing and at the end of each write it indicates the latest data.

The read algorithm always reads data from the last slot completely written.

The two slot mechanism contains no indivisibility constraints and makes use of a bit communication variable. A read starting between writes will access coherent data up to the start of the next but one write, whereas a read starting during a write will only access coherent data up to the start of the next write. Thus, in the absence of any overall control, the mechanism can only be guaranteed to work satisfactorily if the interval between successive writes (end of one to start of next) is always greater than the duration of any read. This condition holds in a range of applications so the two slot mechanism is of some practical significance. When the mechanism fails it is the coherence requirement which is not met (cf the one slot mechanism).

THREE SLOT MECHANISM

A three slot mechanism can be devised which is based on yet another form of operating constraint. table 3 shows the three slot ida design:

An array holds information in transit and there are two control variables: reading indicates the data being read (if any) and written indicates the latest data. The coherence of the control variables is protected by the indivisibility constraint in the read access function.

The preset statements ensure that a read occurring before the first write obtains the null data value, and that both control variables are set to legal values.

The write algorithm always selects the slot which can be guaranteed not to being read and which does not hold the latest data. This is achieved by use of the constant array differ which has the property that the value of any element differs from the values of the corresponding indices. A subtle point here is that, even though reading may change shortly after it has been used to determine index, and before the write assignment is finished, it can only become the same as written and therefore cannot assume the value of index.

The read algorithm uses an indivisible assignment statement to copy written to reading and so select the latest data. This statement effectively provides a critical section whilst control variables are being manipulated.

The operating constraint on this three slot mechanism is minimal and confined to exclusion over control variable access. It fails to meet the basic requirements in a similar manner to the one slot mechanism, but to a much lesser extent. Integrity is critically dependent on the indivisibility of what amounts to a copy instruction between two variables in shared memory. Although this is fairly easy to arrange in a single processor (eg by inhibiting process rescheduling during the copy), it is not so readily achieved in multiprocessor shared memory environments.

Despite the conclusion that the three slot design may result in a small amount of timing interference, intuitively it at first seems that three slots should be enough for full asynchronism (two for the writer to switch between whilst the reader is busy with the third). To investigate this point we relax the exclusion constraint and examine the consequences.

ALTERNATIVE THREE SLOT MECHANISM

The read access function of the three slot ida shown in table 3 contains the indivisible copy statement:

reading ::= written;

Suppose that we replace this by two statements:

temp ::= written; reading ::= temp;

where temp is an implicit working variable in the reading process. The indivisibility constraint is now placed individually on the two variables. This is a substantially weaker constraint, amounting only to ensuring the coherence of these two control variables.

The flaw in this alternative design arises from the situation where the writer has already completed one write (slot 2 say) and started another (slot 3 say) since the start of the last read (sot 1 say), and both processes then manipulate the control variables in a particular interleaved fashion. To illustrate this numerically we start with the state:

reading=1, write=2, index=3

We then have the sequence, resulting in a clash at slot 2:

| Reader | Writer |
|---|---|
| temp: = 2 | |
| | written: = 3 |
| | other operations |
| | index: = 2 |
| reading: = 2 | |

Although this dynamic sequence may be considered unrealistic, it is certainly possible, particularly where the processes can be interrupted or arbitarily sliced by a scheduler. An operating constraint gets around the problem by requiring that the interval between writes is always sufficient to accommodate at least one complete control variable operation in the read access function (of the two slot mechanism). We can conclude that there is a trade off between this algorithm usage constraint and the algorithm execution constraint represented by the indivisible copy instruction. Both forms of the three slot mechanism depend on indivisibility so neither achieves full asynchronism, although they are very close to it.

FULLY ASYNCHRONOUS DESIGNS

Having failed to achieve a fully asynchronous mechanism with the one, two and three slot designs, we add a fourth slot and seek solutions which can cope with the double uncertainty arising from the activity of the two independent processes. We continue as before with a single module software design before considering alternative forms of representation and implementation.

FOUR SLOT MECHANISM

Table 4 gives the four slot ida design. The ida follows the pattern already established, ie it consists of a data area, control variables and two access algorithms.

The data area and control variables are as follows:

var data: array[bit,bit] of data. Data in transit is passed through this array, organised as two pairs of two slots. All slots are preset to null.

var slot: array[bit] of bit. Each element of this array indicates the index of the slot which contains the latest data within the corresponding pair. Both elements are preset to zero.

var reading: bit. This indicates the pair about to be, being, or last read. It is preset to zero.

var written: bit. This indicates the pair last written. It is preset to zero.

The write access procedure (the write algorithm for the mechanism) consists of local variable declarations and a series of operations as follows:

var pair, index: bit. Two variables hold the pair, and the index of the slot within the pair, to be written.

pair: =not reading. This selects a pair for writing by avoiding the pair in which the reader has declared a current interest.

index: =not slot[pair]. This selects a slot within a pair for writing by avoiding the slot in this pair which was last written and which the reader may be reading.

data[pair, index]: =item. This copies the data into the ida.

slot[pair]: =index. The latest data within the selected pair is indicated.

written: =pair. The pair containing the latest data is indicated.

The read access function (the read algorithm for the mechanism) consists of local variable declarations and a series of operations as follows:

var pair, index: bit. Two variables hold the pair, and the index of the slot within the pair, to be read.

pair: =written. The pair indicated as last written is selected for reading.

reading: =pair. This indicates the reader's interest in a particular pair. This statement (in conjunction with the first of the write access procedure) ensures that, after completion of any write in progress, further writes will be switched to the other pair so that the slot which is about to be read cannot be corrupted.

index: =slot[pair]. This selects a slot within the pair selected for reading, choosing the slot in this pair which was last written.

read: =data[pair, index]. This copies data out of the ida.

The index variable in the write access procedure and the pair variable in the read access function are working variables. They are included to indicate the possible increase in efficiency, and reduction in shared memory contention, achieved by taking a local copy (or inverse) of a shared variable. Neither would be required in a more compact form of the algorithms.

The algorithms contain no conditional statements. Control variables do not determine program flow but are used purely as array indices. As such they should not be regarded as flags denoting conditions but rather as addresses denoting memory locations. There are no indivisibility conditions (as in the one and three slot mechanisms) and no usage constraint (as in the two slot mechanism) hence the four slot mechanism is potentially fully asynchronous.

DATA FLOW MODEL

The working of the mechanism can best be seen as a whole with the aid of the data flow model in FIG. 1.

Each box represents a variable. The heavy interconnecting lines indicate the flow of data through the mechanism and the light lines correspond to the transfer of values from one control variable to another. All lines are labelled with a letter and digit giving the relevant algorithm and statement number.

The boxes for the shared variables (reading, written, slot[0], slot[1]) are used purely to hold control values, whereas the boxes for the local variables (index and pair in the write procedure and read function) act as switches to steer data to/from selected slots. These switches can be set with the value of a control variable or its inverse (indicated by a bar), and they may also be read. The index switches are duplicated as are the operations on them. The only effective operations relevant to an index switch are those for which the data route has already been selected by a pair switch.

It can be seen that this data flow model faithfully reflects the sequential write and read algorithms. A route to a slot is opened up by W0 and W1 with data being transferred by W2. A route from a slot is opened up by R0 and R2 with data beng transferred by R3. R1 is used to block new writes to a pair immediately before a read is started, and W3 and W4 indicate new data immediately after completion of a write.

The integrity of the four slot designs is critically dependent on the order of the individual operations in each algorithm. In a sense the mechanism can be regarded as making use of an orthogonal avoidance strategy since each process has total control of one independent axis of the two dimensional data array and is forced to avoid conflict on the other axis. Thus writing is directed to the pair not being used for reading and reading is directed to the slot within a pair not being used for writing. Transitional uncertainty as reader and writer move from one slot to another is catered for by providing enough manoeuvring space to permit tidy completion of any operation in progress at the time when a new operation is started.

DISTRIBUTED PROCESSOR FORMS

The mechanisms presented so far have been expressed as single modules and are directly suitable for single processor implementations where the sharing of a central processing unit prevents true independence of the communicating processes, and the role of an asynchronous mechanism in this limited operating environment is to maximise the dynamic decoupling. The essence of the fully asynchronous mechanism is that it does not lock together the operation of reading and writing processes which are executing independently, so a less restricted form of process execution is required if full exploitation is to be achieved.

Suppose however that the writing and reading processes are located in separate processors, both having visibility of shared memory in which data and instructions can be placed. The degree of asynchronism (ie the extent to which there is no timing interference) achieved in such an operating environment depends on the placement of the component parts of the mechanism. First we assume that there is only one communication bus for the two processors and the memory.

If all components (data and control variables, writing and reading algorithms) are placed in shared memory then asynchronism will be improved over the single processor case in that individual statements can be executed in parallel. However timing interference will still occur on account of access contention (resolved by bus arbitration) as instructions are fetched, and data and control variables are written or read.

Further improvement can be achieved by splitting the design so that the writing and reading algorithms are each allocated to the processor for the relevant using process, and only the shared variables are placed in shared memory. Timing interference now results only from data and control variable access. Design partitioning of this sort can be formally expressed in Mascot 3 but the description here is sufficient to appreciate the dynamic implications.

Clearly full asynchronism can never be achieved if processors and memories are connected by a shared bus. Some of the dual port memories now becoming available are fully asynchronous and this constraint can be eliminated. These memories contain no arbitration and it is up to the user to safeguard data integrity. The four slot design can give full asynchronism if the shared data and control variables are placed in such a memory.

ALGEBRAIC FORM

The four slot ida is a particular software design for a fully asynchronous mechanism. The shared variables and algorithms implement the abstract underlying logic of this form of communication. The essence of this logic can be derived by transforming these variables and algorithms into a more compact algebraic notation. This algebraic form can in turn act as a basis for hardware designs and is more suitable for a mathematical analysis of the mechanism.

The starting point for the transformation is the software design given in table 4 In general any access procedure or function may be considered to have three component operations, the first of which gains visibility of the shared memory in the ida (known as the pre sequence), the second inserts or removes data as appropriate, and the third finally tidies up by carrying out any administration which is necessary as a result of the access operation (known as the post sequence). The access algorithms for the four slot mechanism show that writing has pre and post sequences which respectively open up write access and indicate the latest data, but that reading only has a pre sequence in which the reader's interest in a particular slot is indicated.

Further consideration of the write access procedure shows that, provided that the slot to be next used for writing can be remembered from the end of one write to the beginning of the next, then the write pre and post sequences can be combined into a single post sequence. This simplification is used in the algebraic form; it produces a more balanced solution in which writing and reading slots are open for access over intervals which are only delimited by a single post or pre sequence as appropriate. (It might appear that the distinction between post and pre is now redundant; it is however sensible to continue to use these terms since, to satisfy the freshness requirement, the write post sequence must be executed as soon as possible after a write operation, and the read pre sequence must be executed as late as possible before a read operation).

Thus we can summarise the algorithm definitions which are suitable for an algebraic representation:

| Writing | Reading |
|---|---|
| Open for Writing | Reading Pre Sequence |
| Write Post Sequence | Open for Reading |

In deriving the algebraic equivalent of the four slot software algorithms it is convenient to introduce a more compact notation, thus:

d[bit, bit]≡var data: array[bit, bit] of data.
s[bit]≡var slot: array[bit] of bit.
r≡var reading: bit.
w≡var written: bit.
wp≡var pair: bit in the write access procedure.
ri≡var index: bit in the read access function.

The following access algorithms can now be defined:

| Writing | | Reading | |
|---|---|---|---|
| wr:d[wp,s[wp]]:=input | | r0:r:=w | Read Pre |
| w0:s[wp]:=s[wp] | Write Post | r1:n:=s[r] | Sequence |
| w1:w:=wp | Sequence | rd:output:=d[r,n] | |
| w2:wp:=r̄ | | | |

The combination of write pre and post sequences opens up the possibility of interleaving them rather than placing them consecutively as above. Careful thought reveals that the order of w1 and w2 can be reversed, provided that the old value of wp is remembered and used to set w. This complicates the algorithms a little and results in a later indication of new data. However it suggests scope for the simultaneous execution of w1 and w2.

PARALLEL LOGIC DESIGN

The data flow model of FIG. 1 provides the starting point for the development of equivalent hardware designs. This model suggests mechanisms consisting of interconnected registers, bistables and switches. Appendix B gives the special graphical conventions which will be needed.

The algebraic form of the access algorithms is itself capable of direct implementation in hardware; it is merely necessary to represent the control variables as an interconnected set of discrete elements, and to sequence operations in accordance with the control logic just derived. However, inspection of the first two operations of the write post sequence reveals some scope for parallel execution, with the objective of achieving an earlier indication of new data. Noting that the second operation does not in any way depend on the first we can recast the write algorithm, making use of parallel operations as follows:

wr.d[wp,s[wp]]:=input w0:{s[wp]:=s[wp] || w:=wp} w1:wp:=r̄

Inspection of the read pre sequence reveals that in this case there is a sequential dependency: the result of the first operation must be available before the second operation can be started. A small change to the algorithm removes this sequential constraint. Instead of assigning s[r] to ri we transform ri into a vector rv of type array[bit] of bit so that the complete s array can be assigned to rv, with appropriate post selection within the data transfer statement. Thus the read algorithm can be recast:

r0:{r:=w || rv:=s} rd:output:=d[r,rv[r]]

There are three timing constraints inherent in these new forms of the algorithms:
write skew (w0)≧0. The result of the first operation in w0 is established before the result of the second operation.
read skew (r0)≧0. The input for the first operation in r0 is acquired before the input for the second operation.
duration (w0)+duration (r0)<interval (w1·w0). The time taken by w0 to establish a result plus the time taken by r0 to establish a result must be less than the interval between the start of w0 and the start of w1.

The first and second constraints preserve the ordering of operations within the algorithms. In practice small delays would be used to achieve this, sufficient only to counter the effects of component tolerances. The third constraint means that at least either r0 takes into account the result of w0, or w1 takes into account the result of r0, thus retaining the orthogonal avoidance strategy on which the mechanism is based.

FIG. 2 shows a hardware design which closely follows the data flow model of FIG. 1 and uses the parallel forms of the algorithms developed above. On the input side data is presented to all four slots but the latching pulse is steered to just one slot through switches controlled by the write post sequence logic. On the output side the switches operate in the data connections and are controlled by the read pre sequence logic. The control logic on both sides must conform to the ordering and timing constraints discussed above.

The design, as presented here, is free from the bounded form of flicker if the bit control operations have the appropriate durations and intervals. It is only completely free from dither and the consequent unbounded form of flicker if the writer and reader have a common clock, with a common phase being used to switch the mechanism bistables. In this case there is no intersection of the write and read control logic operation ie all variables are stable when read and new values have their effect in the subsequent cycle. The only ordering constraint which remains relevant is the setting of wp, and this in practice is guaranteed by separating w0 and w1 by one clock cycle. Where the writer and reader have a common clock but the phasing of the control logic switching differs, the mechanism should include an adjustable delay to remove the difference in phase.

The use of a common clock results in a discrete form of asynchronism which falls short of full asynchronism. Data may be written to the mechanism or read from it in an uncnstrained manner but of course the synchronous execution environment ensures that all operations are ultimately locked to the clock. Thus we have asynchronism at the higher information transfer level but not at the lower operation execution level.

Whether or not a common clock is used, control is effectively open loop so that the interval between successive operations on each side must be long enough to allow memory levels to settle before the next operation is applied. This limits absolute speeds of operation but there is no restriction whatsoever on the relative rate, time or duration of data writing and reading. The range of permissible absolute speeds on both sides of the mechanism extend from zero (or dead stop) through to an upper limit determined by memory settling times.

No initialisation logic is shown but is easily added. Alternatively, whatever the state of the mechanism on start up, it will accept the first write operation and work normally thereafter. Thus the initialisation logic can be dispensed with if the first write occurs before the first read (or if the reading of uninitialised, and possibly incoherent, data before the first write does not matter).

EXTERNALLY STABILISED LOGIC

If a hardware design is to be used in a fully asynchronous execution environment then precautions must be taken to limit the inherent vulnerability to flicker and dither. The bounded form of flicker is taken care of by imposing constraints on the durations and intervals of control operations. Rates on the two sides of the mechanism need to be vastly different before this is of any significance. Dither (and unbounded flicker) remains a danger. This is controllable by taking each possibly unstable control value into the process which will have to write it, where it can be allowed to stabilise before it is returned to the mechanism. This gives the using processes complete control over the error rates arising from dither. Where the using processes are programs running in computers it seems inconceivable that instability could persist whilst a control value is passed through a process.

Figure 3:
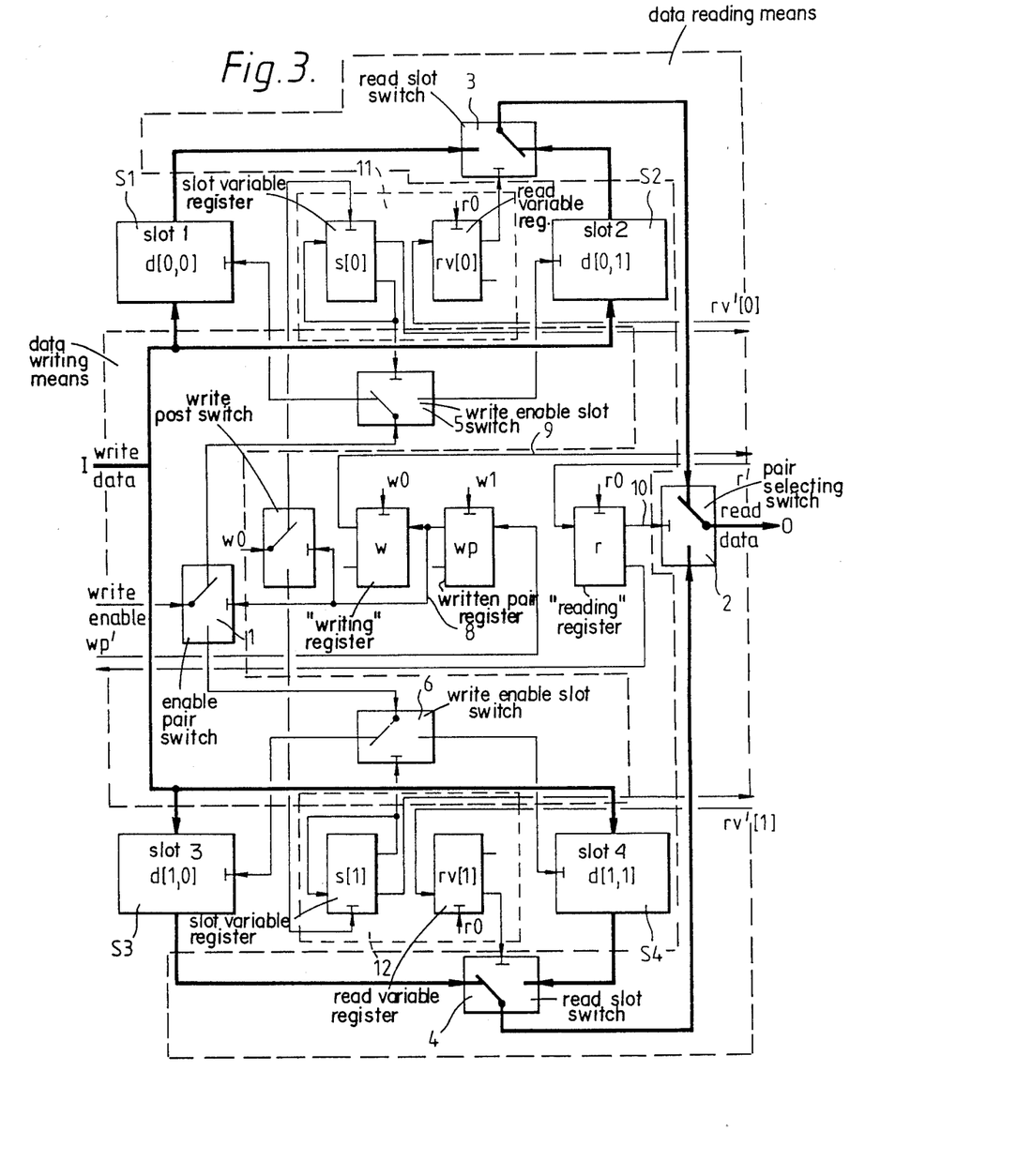
FIG. 3 is a block diagram showing an alternative embodiment of the present invention using externally stabilised logic.

The resulting design is shown in FIG. 3 The relevant algorithms are:

| Writing | Reading |
|---|---|
| wr:d[wp,s[wp]]:=input | re:{r':=w\|\|rv':=s} |
| w0:{s[wp]=s[wp]\|\|w:=wp} | r0:{r:=r'\|\|rv:=rv'} |
| we:wp':=r̄ | rd:output:=d[r,rv[r]] |
| w1:wp:=wp' | |

On the writing side the data is written (wr), the relevant s variable is switched and w is written (w0), the inverse value of r is read and returned as wp' (we), and finally the new value of wp is written (w1). On the reading side the w and s variables are read and returned as r' and rv' (re), the new values of r and rv are written (r0),, and finally the data is read (rd). The real time constraints inherent in this design are threefold:
write skew (w0)≧0.
read skew (re)≧0.
duration (w0)+duration (re+r0)<interval (we·w0).

Parallel operations within the algorithms give three advantages. First, within the limits of skew, data is both indicated as written and acquired for reading in single steps. Second, new data is indicated as written at an earlier point in the write algorithm. Third, when external stabilisation is used, the r' and rv' variables can be stabilised concurrently. There is however a disadvantage: the duration constraint introduces a timing dependency between the two sides which is not present in the serial form.

There is a limiting form of the FIG. 3 design. External stabilisation is removed and the design becomes identical to that shown in FIG. 2. In this case, when used asynchronously, the dither error rate is wholly determined by the quality of the bistables (modern bistables can be designed to such a high standard that external stabilisation may well be unnecessary). Note also that the w0 to w1 interval can be implemented directly as part of the mechanism by inclusion of the appropriate delay.

VARIATIONS AND EXTENSIONS

Many variations and extensions are possible. For example the hardware designs just described allow direct access to the slots selected for writing and reading whereas the four slot ida has procedural interfaces to the slot data. A software design more equivalent to the hardware forms would contain access procedures returning pointers to the selected slot data areas; such a design would also allow combination of write pre and post sequences.

The designs can, if desired, be extended as follows:

The writer, in addition to having write access to the slot selected for writing, can also be given read access, thus allowing this slot to be used as a working variable.

The writer can be given read access to the slot containing the latest data, to allow this data to be referenced whilst building up a new value in the slot selected for writing.

The reader, in addition to having read access to the slot selected for reading, can also be given write access, thus allowing this slot to be used as a working variable. (Note however that this and the previous extension are mutually exclusive).

This last extension allows a semi synchronous form of the mechanism to be developed in which the reader only acts once on the latest data but the writer is unconstrained. This is arranged by adding an action tag to each data item held within the mechanism. The tag would be set within the write access procedure and cleared within the read access function. Should a read access function call find the tag unset it would repetitively invoke the read pre sequence until detecting the presence of new data. This protocol ensures that the reader always processes the freshest data but never wastes time by processing the same data twice.

EXPERIMENTAL VALIDATION

Experimental results have confirmed the soundness of the four slot design. Many variants are possible but the extreme simplicity of the algorithms means that software and hardware implementations are easy to undertake, and satisfactory results have been obtained by several independent researchers. As with any novel idea it is important that it is put to the test by practical realisation.

SOFTWARE IMPLEMENTATION

The simplest form of software investigation of the four slot design consists of a main program which can call up writing and reading procedures embodying the algorithms and having access to the appropriate shared data and control variables. The writing and reading procedures are each programmed as a number of discrete steps which are executed sequentially in an endless loop, and where control is returned to the main program after a number of steps (determined by a parameter) with subsequent reentry continuing the sequence. The main program alternately calls the writing and reading procedures, specifying a random number of steps at each call, thus producing the effect of arbitrary interleaving of the two algorithms.

In order to be able to test for coherence each data item consists of two identical integer values which are written in two separate steps and which are also read in two separate steps. To be able to test for freshness the value indicates the number of items previously written. The reader tests for coherence by checking that it obtains a pair of identical values at each read, and for freshness by comparing the value read with the latest value written at the start of the read presequence (this value being specially made available by the writer). Tests have been carried out during which over one million data items have been passed between the two processes, but no errors or unexpected effects have ever been observed.

Such software experiments exercise the logic in a synchronous execution environment. Even though the algorithms under test are extremely simple, the range of combinations of possible inputs and internal mechanism states would require a very long time for an exhaustive test. This practical difficulty becomes a theoretical impossibility when the mechanism is implemented in a truly asynchronous form with independent clocks on the writing and reading sides.

BOUNDED FLICKER SIMULATION

The software implementation is easily extended to investigate the bounded form of flicker There are three pairs of operations where the algorithms are at risk from this effect:

| Variable | Writing | Reading |
| --- | --- | --- |
| reading | R1 | W0 |
| written | W4 | R0 |
| slot | W3 | R2 |

It can be shown that the integrity of the algorithms is unaffected by bounded flicker. The execution model can be extended to cater for flicker by regarding a control variable write as equivalent to multiple write events where it coincides with a series of reads which obtain flickering values. In this case a single write operation becomes a series of write events producing alternating values before finally delivering the new (changed) value. The individual read and write events can still be regarded as distinct and non coincident, and hence the analytic approach is still valid.

However it is found that flicker can cause consecutive reads to obtain data items in reverse order whilst still meeting the basic requirements specification. This arises from the alternative possibilities both for where new data is indicated by the writer (W3 or W4), and for where the reader is latched onto new data (R0 or W3). This reversal effect amounts to a reflection of the flicker phenomenon through to the higher levels of design. If it is important it can be detected and corrected by the use of serial numbered data.

To investigate flicker the software implementation was modified by programming control bit switching as non monotonic divisible operations. Thus a bit assignment statement where the value of b is copied to a is replaced by a sequence of statements involving a third variable c thus:

a:=b becomes c:=b;a:=b;a:=c;a:=b

Results confirm the expected order reversal effect but emphasise the fact that bounded flicker can only occur when reader and writer operate at grossly different rates to an extent which is only of theoretical interest.

HARDWARE IMPLEMENTATION

Whereas software forms of the mechanism can be set up and investigated within a few hours, hardware implementations require a little more effort. However relatively simple configurations of discrete components can be used to explore the correct operation of the algorithms and in particular to investigate whether the dither phenomenon (and consequent unbounded flicker) can be controlled to an acceptable level.

The hardware implementation chosen to investigate the principles of the mechanism was based directly on the algebraic form of the algorithms Thus the write post and read pre sequences respectively consisted of three and two individual steps. First the orthogonality of the access control logic was investigated and subsequently an operational test was carried out by passing data through a simple experimental configuration consisting of a writing process implemented directly in hardware and a reading process implemented as a program in a microprocessor. So that coherence can be tested each slot in the mechanism comprises two bytes which are written and read as separate operations.

The writer is a simple cyclic process and each cycle it increments a counter in the range 0 to 255, writing the value into both bytes in a slot. It then applies the write post sequence. The rate at which the writer runs is controlled by an external clock and can be varied over a wide dynamic range to allow different relative speeds of writing and reading to be investigated.

The reader is a program running in a loop and each cycle it applies the read pre sequence, reads both bytes, and then carries out some analysis consisting of tests for coherence and ordering of data. Results of the tests are used to build up histograms as follows:

Distribution of the difference in value between the two bytes in a data item (coherence test).

Distribution of the difference in value between a byte and its predecessor (mainly relevant when the writer is faster than the reader). The occurrence of negative differences indicates sequence reversal.

Distribution of the number of consecutive values which are the same (mainly relevant when the reader is faster than the writer).

Hundreds of millions of data items have been passed through this implementation but no loss of coherence or sequence reversal has been observed, and the relative rates of reading and writing as determined from the reader analysis program always conform with the known actual rates. The mechanism appeared to work perfectly although in theory it is vulnerable to dither effects (the writing and reading clocks are independent). Switching rates of modern bistables would indicate extremely low error rates and it can be somewhat frustrating to search for such errors.

CHIP SIMULATION

Two further design variants have been investigated using circuit simulation which forms part of a three micron CMOS chip design and fabrication process. The simulation is carried out at the physical rather than the logical level, and faithfully reflects the switching properties of circuit elements implemented in this technology.

The first design was based on the layout of FIG. 2 with a slight modification to the control sequences to give a closer correspondence to the algebraic form. Thus, on the writing side, w0 is applied to the selected s bistable and then w1 is applied simultaneously to w and wp, reflecting the scope for parallel execution inherent in these operations. On the reading side r0 is applied to r and then r1 is applied to both rv bistables. The second design followed FIG. 7 precisely.

Both designs were shown to be logically sound. The simulation technique allowed switching signals to be positioned in any time relationship and this was used to investigate possible rates of operation and to establish the extent to which the dither hazard might cause problems. The bistables were implemented as master slave D-types with a 'clock to q' time of the order of 8 nanoseconds. This time determines the absolute lower bound of the interval between successive control and data operations on each side of the mechanism. The simulation did exhibit some dither effects in the form of increased settling times when a bistable is switched very close to an input change, but results were not accurate enough to predict an overall mean time between communication errors. Detailed investigation of the bistable characteristics indicated that mean times between errors in excess of the ten years should be achievable if bistable settling times of 50 nanoseconds are allowed.

APPENDIX A: SOFTWARE NOTATION

Program text is written in Pascal with minor extensions as follows:

ida. A module whose component parts will be distributed between the shared memory, the writing process, and the reading process.

data. An arbitrary type assumed to be declared elsewhere. A null value is assumed for initialisation purposes.

access. A prefix denoting that a procedure or function is used to access variables in shared memory.

bit. A basic type of the language; it takes the value 0 or 1.

not. An operator which inverts a bit value.

preset. var declarations may be preset by including an assignment in the declaration.

const. array constants may be declared.

::=. An indivisibility constraint in assignment operations involving one or more shared variables.

APPENDIX B: HARDWARE SYMBOLS

Figure 5:
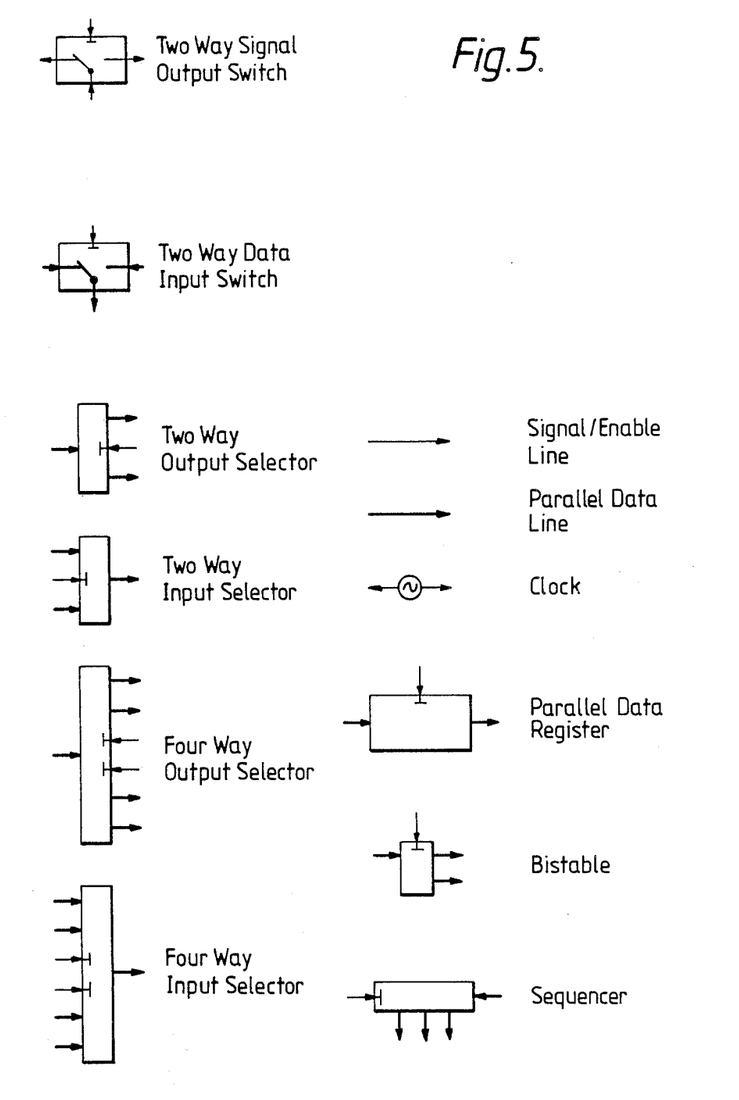
FIG. 5 is a key to the graphical conventions used.

The hardware design is shown in terms of interconnected registers, bistables and switches using the symbols listed in FIG. 5.

Connections Thick lines are parallel data connections. Thin lines carry signals consisting either of a logic level passed between switches and/or bistables, or an enable pulse which allows an input to be latched into a register or bistable.

Switches These either steer a single signal input onto one of two outputs, or select one of two data inputs to be opassed through to a single output. The selection is by a logic level applied to a control point (symbol ⊥) on the switch.

Memory. A register capable of holding a complete data item has single data input and output connections, and a control point at which an enable pulse can be applied. A bistable has a single logic level input and two complementary logic level outputs, and a control point at which an enable pulse can be applied.

TABLE 1
```
Ida one slot;
   var data: data: = null;
   access procedure write (item: data);
      begin data:: = item end;
   access function read: data;
      begin read: = data end;
end.
                                           :One Slot Ida
```

TABLE 2
```
ida two slot;
   var data: array[bit]of data: = (null, null);
       written: bit: = 0;
   access procedure write (item: data);
       var index: bit;
       begin
           index: = not written;
           data[index]: = item;
           written: = index
       end;
   access function read: data;
       var index: bit;
       begin
           index: = written;
           read: = data[index]
       end;
end.
                                           Two Slot Ida
```

TABLE 3
```
ida three slot;
   var data: array[1..3] of data: = (null, null, null);
       reading, written: 1..3: = 1,1;
   access procedure write (item: data);
       const differ = ((2,3,2), (3,3,1), (2,1,1));
       var index: 1..3;
       begin
           index: = differ[reading, written];
           data[index]: = item;
           written: = index
       end;
   access function read: data;
       begin
           reading:: = written;
           read: = data[reading]
       end;
end.
                                           Three Slot Ida
```

TABLE 4
```
ida four slot;
   var data: array[bit, bit] of data: = ((null, null), (null, null));
       slot: array[bit] of bit: = (0,0);
       reading, written: bit: = 0,0;
   access procedure write (item: data);
       var pair, index: bit;
       begin
           pair: = not reading;                {W0}
           index: = not (slot[pair]);          {W1}
           data[pair, index]: = item;          {W2}
           slot[pair]: = index,                {W3}
           written: = pair                     {W4}
       end;
   access function read: data;
       var pair, index: bit;
       begin
           pair: = written;                    {R0}
           reading: = pair;                    {R1}
           index: = slot[pair];                {R2}
           read: = data[pair,index]            {R3}
       end;
```

TABLE 4-continued
```
end.
                                           Four Slot Ida
```

I claim:

1. In a method of operating an asynchronous communication system comprising memory means, slot means formed in said memory means, data writing means, an input operatively connected to said data writing means, data reading means, and an output operatively connected to said data reading means, said method comprising writing data from said input to said memory means and reading data from said memory means to said output, the improvement wherein said slot means comprise first and second pairs of slots and said step of writing data comprises selecting one of said pairs of slots from which no data is being read and selecting one slot of said one pair which is not a slot last written to and writing data from said input to said one slot and said step of reading data comprises selecting a slot to which data was last written and reading data from said slot to which data was last written to said output, said system thereby communicating fresh coherent data asynchronously from said input to said output via said memory means.

2. The method of claim 1 wherein said step of writing data includes three sequential steps wr, w0, w1 given by:

$$wT \cdot d[wp, \overline{s[wp]}] := \text{input}$$

$$w0: \{s[wp] := \overline{s[wp]} \parallel w := wp\}$$

$$w1: wp := \overline{r}$$

and said step of reading data includes two sequential steps r0, rd given by:

$$r0: \{r := w \parallel rv := s\}$$

$$rd: \text{output} := d[r, rv[r]]$$

wherein r is the reading variable, w is the written variable, wp is the written pair variable and rv is the read index vector.

3. The method of claim 1, wherein said data writing means include first and second registers associated with respective pairs of slots and said step of writing data includes setting one of said registers to indicate which slot is written to.

4. The method of claim 1, wherein said input is connected in parallel to said slot means and said data writing means transmit a write enabling signal to said slot means.

5. The method of claim 1, further comprising transmitting control signals from said data writing means and data reading means to an external circuit and receiving control signals returned by said external circuit, thereby externally stabilising said system.

6. In an asynchronous communication system comprising memory means, slot means formed in said memory means, data writing means, an input operatively connected to said data writing means, data reading means, and an output operatively connected to said data reading means, the improvement wherein said slot means comprise a first and second pairs of slots, said data writing means include write pair selector means adapted to select one of said first and second pairs of slots and first and second write slot selector means operatively connected to said write pair selector means and adapted to select one slot of a respective pair of slots, and said data reading means include read pair selector means adapted to select one of said first and second pairs of slots and first and second read slot selector means operatively connected to said read pair selector means and adapted to select one slot of a respective pair of slots, said system being adapted to transmit asynchronously fresh coherent data from said input to said output via said memory means.

7. The system of claim 6, wherein said data writing means include first and second registers associated with respective pairs of slots and adapted to indicate which slot of a respective pair of slots was last written to.

8. The system of claim 7, wherein said write slot selector means include first and second bistable devices operatively connected to respective ones of said registers and arranged to toggle between a state in which data is routed to one slot of a pair of slots and a state in which data is routed to another slot of a pair of slots.

9. The system of claim 6, wherein said write pair selector means include a bistable switch and control signal transmitting means connecting said write pair selector means to said read pair selector means, said bistable switch being adapted to toggle between a state in which data is routed to said first pair of slots and a state in which data is routed to said second pair of slots in response to a signal received from said read pair selector means via said control signal transmitting means.

10. The system of claim 6, wherein said input is operatively connected in parallel to said slot means and said data writing means are adapted to transmit a write enabling signal to said slot means.

11. The system of claim 6, further comprising clock pulse source means operatively connected to said data writing means and said data reading means and adapted to constrain timing of said data writing means and said data reading means.

12. The system of claim 6, further comprising stabilising signal transmitting means operatively connected to said data writing means and said data reading means and adapted to transmit a control signal from said data writing means and said data reading means to an external circuit and to receive a control signal returned by said external circuit thereby stabilising said system.

13. The system of claim 8, wherein said input is operatively connected in parallel to said slot means and said data writing means are adapted to transmit a write enabling signal to said slot means.

* * * * *